Nov. 1, 1966 R. E. WIRSCHING 3,283,111

SWITCH ENCLOSURE HAVING ALTERNATE MOUNTING POSITIONS

Filed June 10, 1965 2 Sheets-Sheet 1

INVENTOR
R. E. WIRSCHING
BY Harry L. Newman
ATTORNEY

United States Patent Office 3,283,111

Patented Nov. 1, 1966

3,283,111

SWITCH ENCLOSURE HAVING ALTERNATE MOUNTING POSITIONS

Robert E. Wirsching, Greenfield, Ind., assignor to Bell Telephone Laboratories, Incorporated, New York, N.Y., a corporation of New York Filed June 10, 1965, Ser. No. 462,972

10 Claims. (Cl. 200—168)

This invention relates to enclosures for switches in general and enclosures for manually actuated switches in particular.

An object of this invention is to provide a switch enclosure for a manually actuated switch that permits the actuator of the switch to be readily accessible whether the switch enclosure is mounted on a vertical surface, such as a wall, or on a horizontal surface, such as a desk top.

This and other objects of this invention are achieved in an illustrative embodiment thereof wherein the switch enclosure comprises a base on which is mounted a generally rectangular cover having a planar top and sides. The top has an inclined portion adjacent to one of the sides, and the inclined portion and the adjacent side each have a symmetrical opening of substantially the same configuration formed therein.

A multiple pushbutton switch is alternatively mountable on the base so as to have the pushbuttons thereof protrude through one or the other of these openings, the switch extending parallel to the base when the pushbuttons protrude through the opening in the side and the switch extending at an angle to the base when the pushbuttons protrude through the opening in the top. In addition, a closure member is alternatively mountable on the switch so that no matter which opening the pushbuttons protrude through, the closure member fills the opening through which the pushbuttons do not protrude and provides a frame about the pushbuttons that fills the space between the pushbuttons and the periphery of the opening through which the pushbuttons do protrude.

A feature of this invention resides in a switch enclosure that permits a manually actuated switch to be mounted therein so that the actuator of the switch protrudes through the enclosure at an angle to its base or parallel to its base.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

Figure 1:
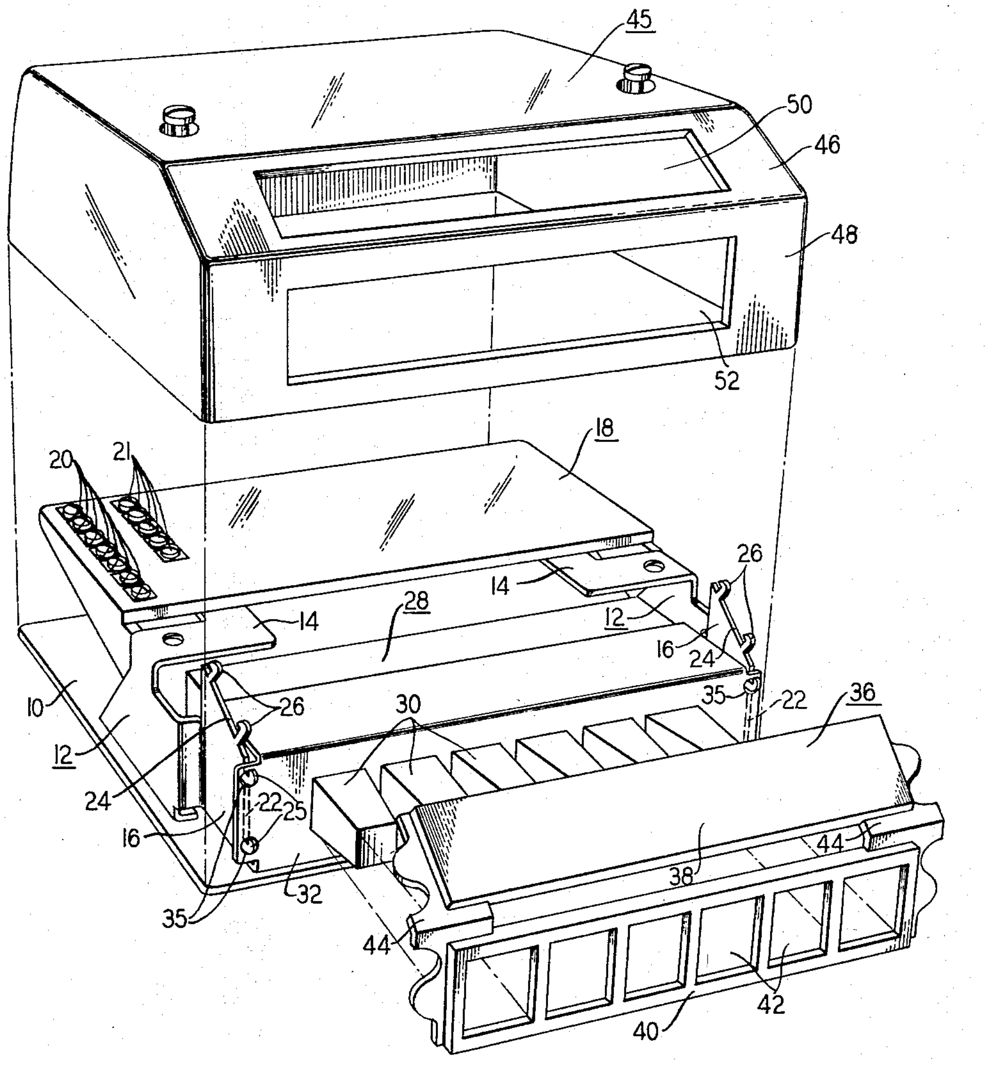
FIG. 1 is an exploded perspective view of the switch enclosure with the switch positioned so that the pushbuttons thereof protrude through the side.

Referring to the drawing and FIG. 1 in particular, the switch enclosure comprises a planar base 10 having a pair of spaced brackets 12 mounted thereon, each bracket including a platform portion 14 and a support portion 16. The platform portions 14 lie in a common plane that extends parallel to the plane of the base 10, and they have a terminal board 18 secured thereto. The terminal board 18 has a plurality of terminals 20 mounted therein, each of which extends through and depends from the underside of the board, and each of which has a screw

21 threaded into the topside thereof. The purpose served by the terminal board 18 is hereinafter explained.

The support portion 16 of each bracket 12 lies in a plane that extends perpendicular to the plane of the base 10 and has a side edge 22 that extends at a 90 degree angle to the base and an inclined edge 24 that extends at a 30 degree angle to the base, the two edges forming an angle of 120 degrees threbetween. Pairs of spaced hooks 25 and 26 respectively protrude from each side edge 22 and each inclined edge 24, and the hooks serve to secure a pushbutton switch 28 to the brackets 12.

The pushbutton switch 28, which is of the type disclosed in my copending application, Serial No. 424,997, filed January 12, 1965, includes a plurality of pushbuttons 30 each of which actuates one or more pairs of contacts (not shown). The contact pairs are interconnected with the circuit in which the pushbutton switch 28 operates by means of the terminal board 18, leads from the contacts being advantageously secured to the underside of the terminals 20, such as by soldering, and leads from the circuit being advantageously secured to the topside of the terminals, such as being captured beneath the heads of screws 21. This arrangement permits the interconnection between the contacts and the circuit to be readily altered.

The pushbuttons 30 protrude above a top surface 32 of the pushbutton switch 28, and the top surface is of a length to overlie the support portions 16 of the brackets 12 when the pushbutton switch is positioned between the brackets. The top surface 32 has a pair of spaced holes 35 therein adjacent each end thereof, and the spacing between the pairs of holes is substantially the same as the spacing between the pairs of hooks 25 on the side edges 22 and between the pairs of hooks 26 on the inclined edges 24. In addition, the holes 35 of each pair are spaced substantially the same distance apart as the hooks 25 and 26 of each pair, and the holes are of a size to permit the hooks to pass therethrough.

As a result, the pushbutton switch 28 is alternatively positionable with the top surface 32 thereof either positioned over the pairs of hooks 25 on the side edges 22, the hooks securing the top surface to the side edges, or over the pairs of hooks 26 on the inclined edges 24, the hooks securing the top surface to the inclined edges. When the top surface 32 is secured to the side edges 22 of the support portions 16, the pushbuttons 30 protrude parallel to the base 10. When, on the other hand, the top surface 32 is secured to the inclined edges 24 of the support portions 16, the pushbuttons 30 protrude at an angle of 60 degrees to the base 10.

A closure member 36 is adapted to be alternatively positioned on the pushbutton switch 28 and the support portions 16 of the brackets 12 in either one of two positions depending upon the position of the pushbutton switch on the support portions. The closure member 36 comprises a rectangular capping portion 38 that is symmetrical about both its transverse and longitudinal axes and a framing portion 40 that has substantially the same size and shape as the capping portion but includes a plurality of openings 42 therein that correspond in number, size, and spacing to that of the pushbuttons 30.

A pair of web portions 44 join the capping portion 38 to the framing portion 40 at an angle of 120 degrees, which is the same as the angle between the side and inclined edges 22 and 24 of the support portion 16. In addition, the web portion 44 extends laterally from the capping and framing portions 38 and 40 a distance such that when the capping and framing portions are positioned between the support portion 16, the web portions overlie the side and inclined edges 22 and 24. Finally, the web portions 44 extending laterally from the capping portion 38 are of a greater thickness than the web portions extending laterally from the framing portion 40.

As a result of the above, no matter which pair of edges of the support portions 16 the pushbutton switch 28 is mounted on, the closure member 36 is positionable with the framing portion 40 thereof resting on the switch, the pushbuttons 30 extending through the openings 42 in the framing portion, and with the capping portion 38 located between the pair of edges on which the switch is not mounted, each web portion 44 resting on both the top surface 32 and on the edges on which the switch is not mounted. Specifically, when the pushbutton switch 28 is mounted on the pairs of hooks 25 on the side edges 22, the closure member 36 is positionable with the framing portion 40 resting on the switch and with the capping portion 38 located between the inclined edges 24, the web portions 44 resting on the top surface 32 of the switch and on the inclined edges. When, on the other hand, the pushbutton switch 28 is mounted on the pairs of hooks 26 on the inclined edges 24, the closure member is rotated 180 degrees so it is positioned with the framing portion 40 resting on the switch and with the capping portion 38 located between the side edges 22, the web portions 44 resting on the top surface 32 of the switch and on the side edges.

A cover member 45 is fastened to the platform portions 14 of the brackets 12 to enclose the brackets, terminal board 18, pushbutton switch 28, and closure member 36. The cover 45 is generally rectangular in shape and includes a planar top from which four planar sides depend. The top has an inclined portion 46 that extends at an angle of 120 degrees to an adjacent front side 48 and the inclined portion and front side have openings 50 and 52 respectively formed therein that have substantially the same circumferential configuration as the capping and framing portions 38 and 40 of the closure member 36. In addition, the spacing between the openings 50 and 52 is substantially the same as the spacing between the capping and framing portions 38 and 40. As a result, no matter in which of the alternative positions the pushbutton switch 28 and closure member 36 are placed, the capping portion 38 occupies one of the openings 50 and 52 and the framing portion occupies the other.

Figure 2:
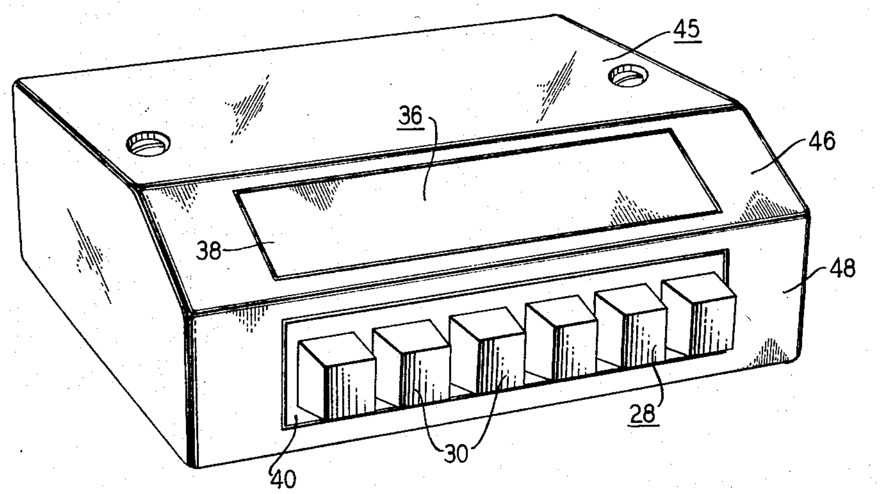
FIG. 2 is the same as FIG. 1 except that the components of the switch enclosure are assembled.
Figure 3:
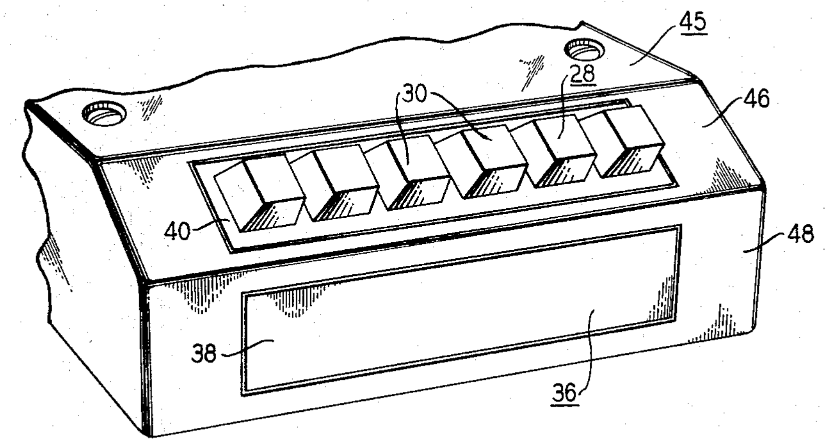
FIG. 3 is a portion of a perspective view of the switch enclosure with the switch positioned so that the pushbuttons thereof protrude through the top.

Thus it is seen that the switch enclosure is a self-contained unit that permits the switch enclosed therein to be alternatively placed in either one of two positions whereby the actuator of the switch either extends parallel to the base of the enclosure, as shown in FIG. 2, or at an angle to the base, as shown in FIG. 3. The switching enclosure is thereby universal in application inasmuch as no matter what the orientation of the surface on which it is mounted, horizontal, vertical, or even inclined, the switch can be positioned so that the actuator of the switch is readily accessible. Furthermore, no matter which position is selected for the switch, the enclosure always has a coherent appearance.

What is claimed is:

1. A switch enclosure including a base;

a cover mounted over the base, the cover including a first and second surface inclined to one another, the first and second surfaces each having an opening therein of substantially the same configuration;

a switch mounted within the enclosure formed by the cover and the base, the switch alternatively positionable within the enclosure in either one of two positions, and the switch having an actuator that extends through one of the openings in the cover depending upon the position selected for the switch;

a closure member having a capping portion and a framing portion each of which has substantially the same peripheral configuration as the openings in the cover, the framing portion having an opening therein of a size to permit the actuator of the switch to extend therethrough, the closure member alternatively positionable within the enclosure so that no matter which opening in the cover the actuator of the switch extends through, the capping portion fills the opening through which the actuator does not extend and the framing portion fills the space between the actuator and the opening through which the actuator does extend.

2. A switch enclosure as in claim 1 wherein the first and second surfaces of the cover are inclined to one another at a particular angle, and the capping and framing portions of the closure member are inclined to one another at the particular angle.

3. A switch enclosure as in claim 2 wherein the openings in the first and second surfaces of the cover are spaced a particular distance apart and the capping and framing portions of the closure member are spaced the same particular distance apart.

4. A switch enclosure as in claim 3 wherein the openings in the first and second surfaces of the cover are symmetrical about their longitudinal and traverse axes.

5. A switch enclosure as in claim 4 wherein the cover includes a top and a plurality of sides depending therefrom the top being inclined adjacent to the front side thereof at the particular angle, and the top and front side having the symmetrical openings therein spaced the particular distance apart.

6. A switch enclosure as in claim 5 further including a bracket mounted on the base, the bracket having a pair of support surfaces inclined to one another at the particular angle, the switch being alternatively mountable on one or the other of the support surfaces.

7. A switch enclosure as in claim 6 wherein each of the support surfaces has a pair of hooks on which the switch is mounted.

8. A switch enclosure as in claim 7 wherein the bracket further includes a platform surface and a terminal board is mounted thereon, the terminal board serving to interconnect the switch with a circuit in which it operates.

9. A switch enclosure comprising:

an enclosure including a first and second surface inclined to one another at a particular angle, the first and second surfaces each having an opening therein of substantially the same configuration;

a switch mounted within the enclosure, the switch alternatively positional within the enclosure in either one of two positions, and the switch having an actuator that extends through one of the openings in the enclosure depending upon the position selected for the switch;

a closure member having a capping portion and a framing portion each of which has substantially the same peripheral configuration as the openings in the enclosure, the framing portion having an opening therein of a size to permit the actuator of the switch to extend therethrough, and the closure member alternatively positionable within the enclosure so that no matter which opening in the enclosure the actuator of the switch extends through, the capping portion fills the opening through which the actuator does not extend and the framing portion fills the space between the actuator and the opening through which the actuator does extend.

10. A switch enclosure comprising a base;

a cover mounted over the base, the cover having a top and a plurality of sides depending from the top, the top being inclined to one of the sides at a particular angle, the inclined top and side each having an opening therein of substantially the same configuration;

a closure member having a capping portion and a switch receiving portion inclined to the capping portion at the particular angle, the capping portion and switch receiving portion each substantially the same size as the openings in the cover, the closure member alternatively positionable in a first and a second position, the closure member in the first position having the capping portion positioned in the opening in the top of the cover and the switch receiving portion positioned in the side of the cover, and the closure member in the second position having the capping portion positioned in the opening in the side of the cover and the switch receiving portion positioned in the top of the cover.

No references cited.

ROBERT K. SCHAEFER, *Primary Examiner.*